Sept. 18, 1928.  1,684,554
G. RIEFENSTAHL
PROTECTIVE SHEATH FOR FLEXIBLE SHAFTS
Filed June 22, 1927
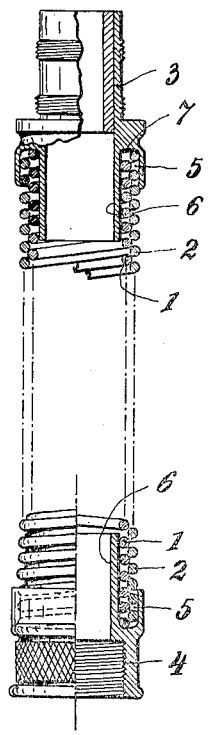
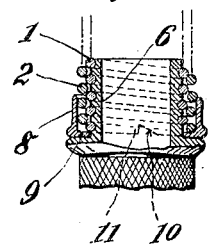
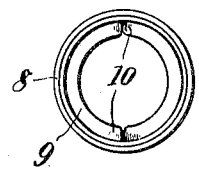
Inventor:
GUSTAV RIEFENSTAHL
By Conway T. Cox
Attorney Patented Sept. 18, 1928.

1,684,554

UNITED STATES PATENT OFFICE.

GUSTAV RIEFENSTAHL, OF BERLIN-TREPTOW, GERMANY, ASSIGNOR TO DEUTSCHE GOLD- UND SILBERSCHEIDEANSTALT, OF FRANKFORT-ON-THE-MAIN, GERMANY.

PROTECTIVE SHEATH FOR FLEXIBLE SHAFTS.

Application filed June 22, 1927, Serial No. 200,723, and in Germany June 23, 1926.

The invention relates to a protective sheath for flexible shafts, and consists of two or more helical wire coils which are of the same pitch but different diameters and are screwed one into the other to produce a closed sheath. The sheath can be employed for all kinds of flexible shafts for driving machinery of every description; it is particularly suitable for duplex joints in driving shafts for dental drills.

According to the invention connecting sockets, which may be of various forms, are provided at the ends of the sheath. The sockets may be provided with annular cavities to enable them to be attached to the helical sheath, the ends of the sheath fitting into the cavities and being advantageously soldered in. Another method of attaching the sockets to the sheath is by providing each of them with an extended neck over which the corresponding end of the sheath is drawn. The socket may, however, be screw threaded to suit the cross section and pitch of the inner or outer coil, the corresponding end of the coil being screwed on or in the screw thread.

It is particularly advantageous to provide the screw thread externally upon the extended neck upon which the sheath is screwed.

In order to facilitate loosening of the sheath on the sockets, when desired, each is provided with a rotary part having projections which abut against the flat faces of the ends of the wires of the coils, so that when rotated it opens the coils.

It is known to enclose flexible shafts and duplex joints in protective sheaths consisting of flexible metal tubes or simple metal helices provided with a leather covering. The metal tubes, however, are only provided with a limited amount of flexibility and do not allow sufficiently for the variations in length to which more particularly the duplex joints are continuously subjected by reason of changing strains. The more flexible simple leather covered helices also have this disadvantage and furthermore if the shafts break the leather covering and particularly the duplex joints are nearly always effected by the sharp upwardly bending ends of the duplex springs. The protective sheath according to the invention avoids all these disadvantages and allows bends in the duplex joints that form complete loops.

Two forms of the protective sheath according to the invention are illustrated by way of example in the accompanying drawings, in which:

Figure 1 is an illustration of the sheath with connecting sockets, partly in section and Figure 2 is a part sectional view showing a modified form of connection between sheath and socket with means for facilitating removal.

Figure 3 being a plan of said means shown in Fig. 2.

In the forms illustrated a closed sheath is produced by screwing together two helical wire coils 1 and 2, which have the same pitch, but different diameters and which are advantageously made of spring steel. The cross section of the wire is, according to the drawings, circular, but it may have any other desired form. Furthermore, wires may be used having two different cross sections, so long as they form a closed sleeve.

The sheath is provided at its ends with sockets 3 and 4, the flanges 7 of which have cavities 5 for the reception of the ends of the sheath and if necessary for soldering material. The inner wall of each cavity 5 is advantageously provided with an extended neck 6 over which are drawn the corresponding ends of the sheath.

As shown in Figure 2, the ends of the sheath are screwed onto the extended necks 6 of the sockets 3 and 4, the necks 6 being screw threaded to correspond to the cross section and the pitch of the inner coil 1. By suitably screw threading the outer wall of the cavity 5 the outer coil 2 instead of the inner coil could be screwed into the sockets.

It is not possible to loosen the sheath from the neck 6 by merely unscrewing the coils 1 and 2, as they would draw in together. A special member is, however, provided to enable them to be unscrewed (Figures 2 and 3). This consists of a rotary part 8, which is placed on the end of the sheath and which has a stop flange 9 engaging under the ends of the coils. On the flange are mounted two teeth or projections 10, each of which engages with the flat face of the end 11 of a coil. When the part 10 is rotated the coils 1 and 2 are slightly opened, thus rendering it possible for the sheath to be unscrewed from the neck 6. The same purpose could be served by one stop or projection 10 that opens a coil upon the rotation of the part 8; two stops, however, are preferable for certainty of action.

I claim:

1. A protective sheath for flexible shafts comprising at least two helical wire coils of equal pitch and of different diameter screwed together to form a closed sheath, connecting sockets at the ends of said coils, rotary members on said sockets, flanges underlying the ends of the coils on said rotary members, and projections on said flanges for engaging the ends of the wires of the coils.

2. In combination, a flexible tubing comprising at least two helical wire coils screwed together to form a closed tube, sockets connected to at least one of said coils at the ends thereof, and means upon said sockets for holding said ends stationary while rotating said sockets relative thereto.

In testimony whereof I affix my signature.

GUSTAV RIEFENSTAHL.